(12) United States Patent
Yamada et al.

(10) Patent No.: US 11,658,467 B2
(45) Date of Patent: May 23, 2023

(54) BUSBAR CONNECTING DEVICE

(71) Applicant: Mitsubishi Electric Corporation, Tokyo (JP)

(72) Inventors: Shintaro Yamada, Tokyo (JP); Katsushi Nakada, Tokyo (JP); Katsuki Hotta, Tokyo (JP); Yasutomo Otake, Tokyo (JP); Takao Tsurimoto, Tokyo (JP); Shintaro Kuroaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/293,497

(22) PCT Filed: Dec. 26, 2018

(86) PCT No.: PCT/JP2018/047718
§ 371 (c)(1),
(2) Date: May 13, 2021

(87) PCT Pub. No.: WO2020/136737
PCT Pub. Date: Jul. 2, 2020

(65) Prior Publication Data
US 2022/0006270 A1    Jan. 6, 2022

(51) Int. Cl.
*H02B 13/00* (2006.01)
*H02G 5/08* (2006.01)
(Continued)

(52) U.S. Cl.
CPC ............. *H02B 1/20* (2013.01); *H02B 13/005* (2013.01); *H02B 13/02* (2013.01); *H02G 5/08* (2013.01)

(58) Field of Classification Search
CPC ........ H02G 5/08; H02B 13/005; H02B 13/02; H02B 13/0358
See application file for complete search history.

(56) References Cited

U.S. PATENT DOCUMENTS 3,747,048 A * 7/1973 Johnson ................. H01R 13/53
439/276
6,392,157 B2 * 5/2002 Arioka ................. H02B 13/005
174/70 B
(Continued)

FOREIGN PATENT DOCUMENTS

CN    205304199 U  *  6/2016
DE    3722955 A1    1/1989
(Continued)

OTHER PUBLICATIONS

International Search Report (PCT/ISA/210) and Written Opinion (PCT/ISA/237) dated Mar. 12, 2019, by the Japan Patent Office as the International Searching Authority for International Application No. PCT/JP2018/047718.
(Continued)

*Primary Examiner* — Robert J Hoffberg
(74) *Attorney, Agent, or Firm* — Buchanan Ingersoll & Rooney PC (57) ABSTRACT

Provided is a busbar connecting device that can achieve good workability and high reliability at the same time. The busbar connecting device includes: a connection portion in which a busbar conductor and a current conductor of a bushing are connected; an insulation busbar connector covering the connection portion; a work hole communicating with the connection portion from an outside of the insulation busbar connector; and an insulating plug inserted into the work hole and sealing the insulation busbar connector, wherein a surface pressure between an inner circumferential surface of the work hole and an outer circumferential surface of the insulating plug is greater at a deep part of the work hole than at a shallow part of the work hole.

8 Claims, 6 Drawing Sheets

(51) Int. Cl.
  *H02B 1/20* (2006.01)
  *H02B 13/02* (2006.01)

(56) References Cited

U.S. PATENT DOCUMENTS

| | | | | |
|---|---|---|---|---|
| 6,520,795 | B1 * | 2/2003 | Jazowski | H01R 4/56 |
| | | | | 439/801 |
| 7,568,927 | B2 * | 8/2009 | Hughes | H01R 13/187 |
| | | | | 439/181 |
| 7,938,682 | B2 * | 5/2011 | Su | H01R 13/53 |
| | | | | 439/587 |
| 7,946,870 | B2 * | 5/2011 | Hughes | H02G 15/04 |
| | | | | 439/181 |
| 9,112,322 | B2 * | 8/2015 | Siebens | H01R 25/006 |
| 9,124,050 | B2 * | 9/2015 | Siebens | H01R 13/207 |
| 9,350,103 | B2 * | 5/2016 | Siebens | H01R 24/20 |
| 11,056,862 | B2 * | 7/2021 | Yamada | H01R 24/38 |
| 2008/0261465 | A1 | 10/2008 | Hughes et al. | |
| 2010/0075520 | A1 | 3/2010 | Hughes et al. | |

FOREIGN PATENT DOCUMENTS

| | | | | | |
|---|---|---|---|---|---|
| DE | 3722955 | A1 * | 1/1989 | | |
| DE | 19502048 | A1 * | 7/1996 | | H01R 13/53 |
| DE | 102007063478 | A1 | 2/2009 | | |
| EP | 1986282 | A2 | 10/2008 | | |
| EP | 2930804 | A1 * | 10/2015 | | H02B 13/005 |
| EP | 3993192 | A1 * | 5/2022 | | H02B 3/00 |
| JP | S54145988 | A | 11/1979 | | |
| JP | H0556541 | A | 3/1993 | | |
| JP | H07255106 | A * | 3/1995 | | |
| JP | H07255107 | A * | 3/1995 | | |
| JP | 2613404 | B2 * | 5/1997 | | |
| JP | H09261836 | A | 10/1997 | | |
| JP | H10248151 | A * | 9/1998 | | |
| JP | 3078483 | B2 * | 8/2000 | | |
| JP | 2000278826 | A * | 10/2000 | | H02B 13/005 |
| JP | 2002345131 | A | 11/2002 | | |
| JP | 2003016881 | A | 1/2003 | | |
| JP | 2013219887 | A * | 10/2013 | | |
| JP | 2014033562 | A | 2/2014 | | |
| JP | 2015204260 | A * | 11/2015 | | H01R 13/52 |
| WO | WO-2004049530 | A1 * | 6/2004 | | H01R 24/38 |
| WO | WO-2022024164 | A1 * | 2/2022 | | H02B 13/035 |

OTHER PUBLICATIONS

Extended European Search Report dated Nov. 10, 2021, issued in the corresponding European Patent Application No. 18944515.8, 9 pages.

* cited by examiner

BUSBAR CONNECTING DEVICE

TECHNICAL FIELD

The present disclosure relates to a busbar connecting device.

BACKGROUND ART

A busbar connecting device used in electrical apparatuses such as a circuit breaker, a disconnector, and a switch, is covered around with an insulation busbar connector formed of a flexible insulating material and has holes formed therein in mainly three directions. A bushing and an insulating plug made of epoxy resin, and a solid insulation busbar made of insulating rubber or epoxy resin, are inserted into these holes. Among these parts, the bushing and the insulating plug have a truncated cone shape with a tapered distal end, and, in order to insert them into the holes and stably mount them thereto, the insulation busbar connector has holes formed in a truncated cone shape tapered toward a deep part thereof.

During assembly of the busbar connecting device, the bushing and the solid insulation busbar are inserted from two directions of the three holes formed in the insulation busbar connector, and then, a stud bolt protruding from the end of the bushing and the solid insulation busbar are fixed from a work hole into which the insulating plug is to be inserted.

Then, into the truncated-cone-shaped work hole of the insulation busbar connector, the insulating plug having a truncated cone shape corresponding to the shape of the work hole is press-fitted and fixed, whereby the busbar connecting device can be obtained (for example, Patent Document 1).

CITATION LIST

Patent Document

Patent Document 1: Japanese Laid-Open Patent Publication No. 5-56541

SUMMARY OF THE INVENTION

Problems to be Solved by the Invention

In the process of press-fitting, into the truncated-cone-shaped work hole formed in the insulation busbar connector, the insulating plug having a truncated cone shape corresponding to the shape of the work hole, the entire outer circumferential surface of the insulating plug and the entire inner circumferential surface of the work hole come into contact with each other. At this time, inserting the insulating plug while turning the insulating plug requires a significantly great force.

For stable insertion of the insulating plug, it is necessary to make the diameter of the truncated-cone-shaped insulating plug larger than the diameter of the work hole. However, making the diameter of the insulating plug excessively large results in an excessively great surface pressure, which sometimes makes it impossible to insert the insulating plug.

In contrast, when the truncated-cone-shaped insulating plug is designed in the same size as the work hole, the surface pressure is not great, so that the insertion thereof is easy.

On the other hand, the pressure of an air space in the insulation busbar connector increases with the insertion of the insulating plug. When the surface pressure between the outer circumferential surface of the insulating plug and the inner circumferential surface of the work hole is not great, air voids may be present between the insulating plug and the work hole near the distal end of the insulating plug due to the pressure of the air space. The problem is that, since an area near the distal end of the insulating plug is close to a busbar, when a voltage is applied to the busbar and an electrical apparatus such as a circuit breaker is operated, discharge occurs in an air void portion, thus deteriorating the insulation busbar connector.

The present disclosure has been made to solve the above problem, and an object of the present disclosure is to obtain a busbar connecting device which achieves high reliability because air voids are not present between the outer circumferential surface of an insulating plug and the inner circumferential surface of a work hole and which also achieves good workability when the insulating plug is press-fitted.

Solution to the Problems

A busbar connecting device according to the present disclosure includes: a connection portion in which a busbar conductor and a current conductor of a bushing are connected; an insulation busbar connector covering the connection portion; a work hole communicating with the connection portion from an outside of the insulation busbar connector; and an insulating plug inserted into the work hole and sealing the insulation busbar connector, wherein a surface pressure between an inner circumferential surface of the work hole and an outer circumferential surface of the insulating plug is greater at a deep part of the work hole than at a shallow part of the work hole.

Effect of the Invention

A busbar connecting device according to the present disclosure can achieve good workability and high reliability at the same time.

DESCRIPTION OF EMBODIMENTS

In the description of embodiments and the drawings, portions denoted by the same reference character are identical or corresponding portions.

Embodiment 1

Hereinafter, embodiment 1 will be described with reference to FIG. 1 to FIG. 4.

Figure 1:
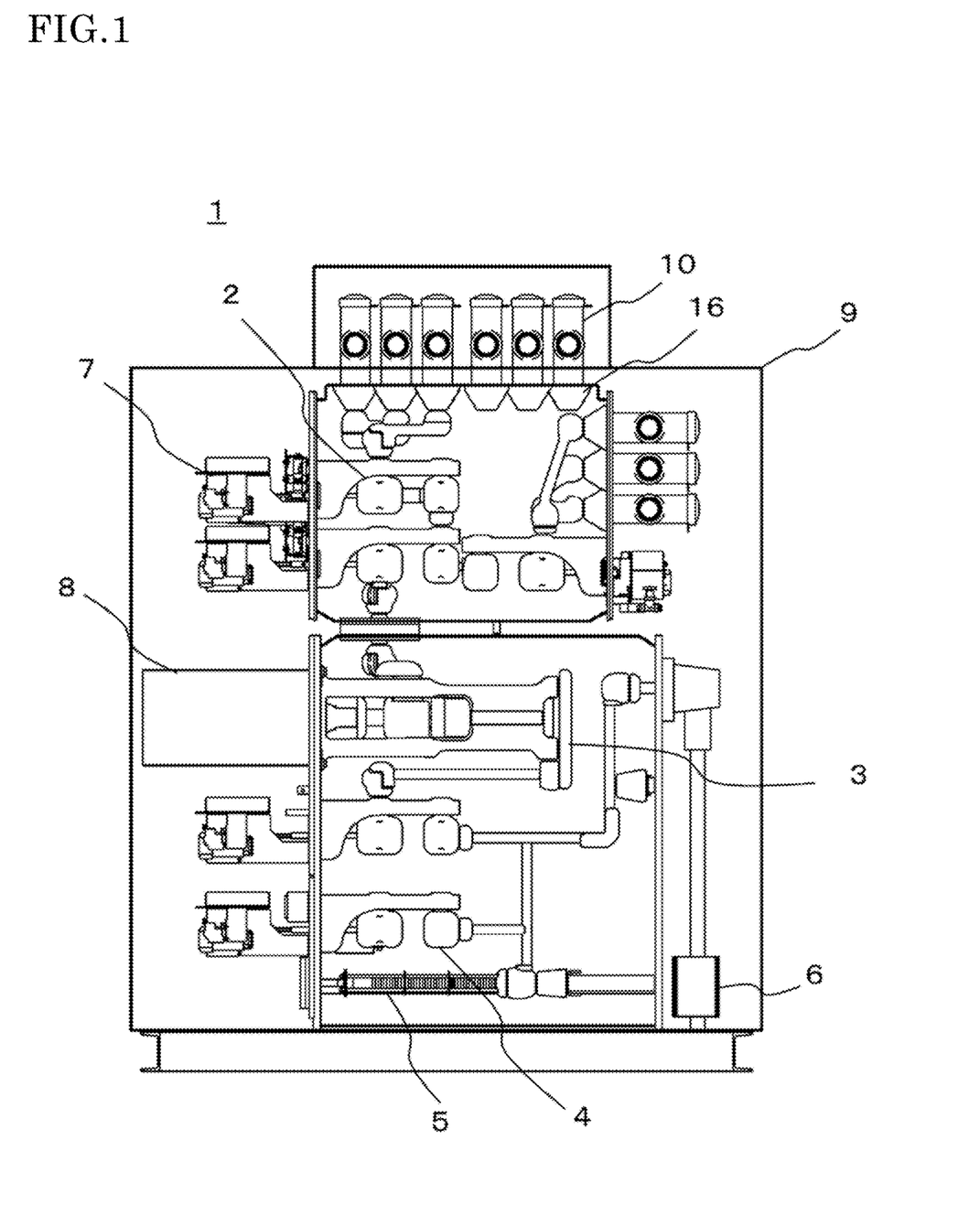
FIG. 1 is a side sectional view of a switchgear, showing a usage example of a busbar connecting device.
Figure 2:
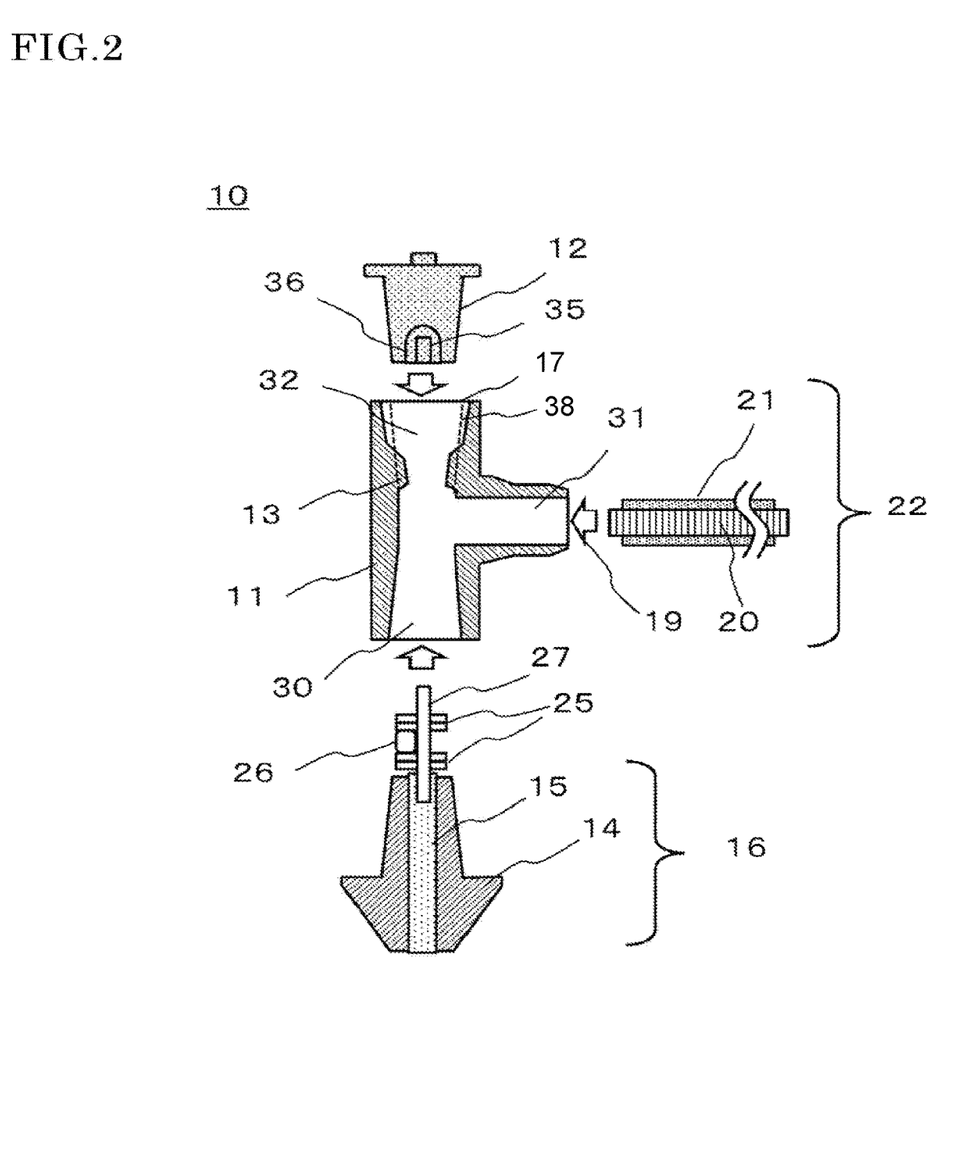
FIG. 2 is a sectional view showing the structure of the busbar connecting device of embodiment 1.
Figure 3:
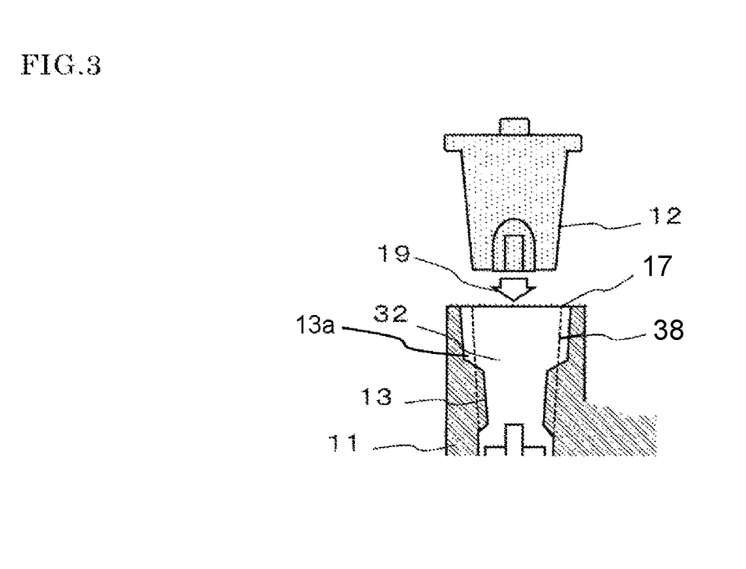
FIG. 3 is a sectional view showing a work hole portion of the busbar connecting device of embodiment 1.
Figure 4:
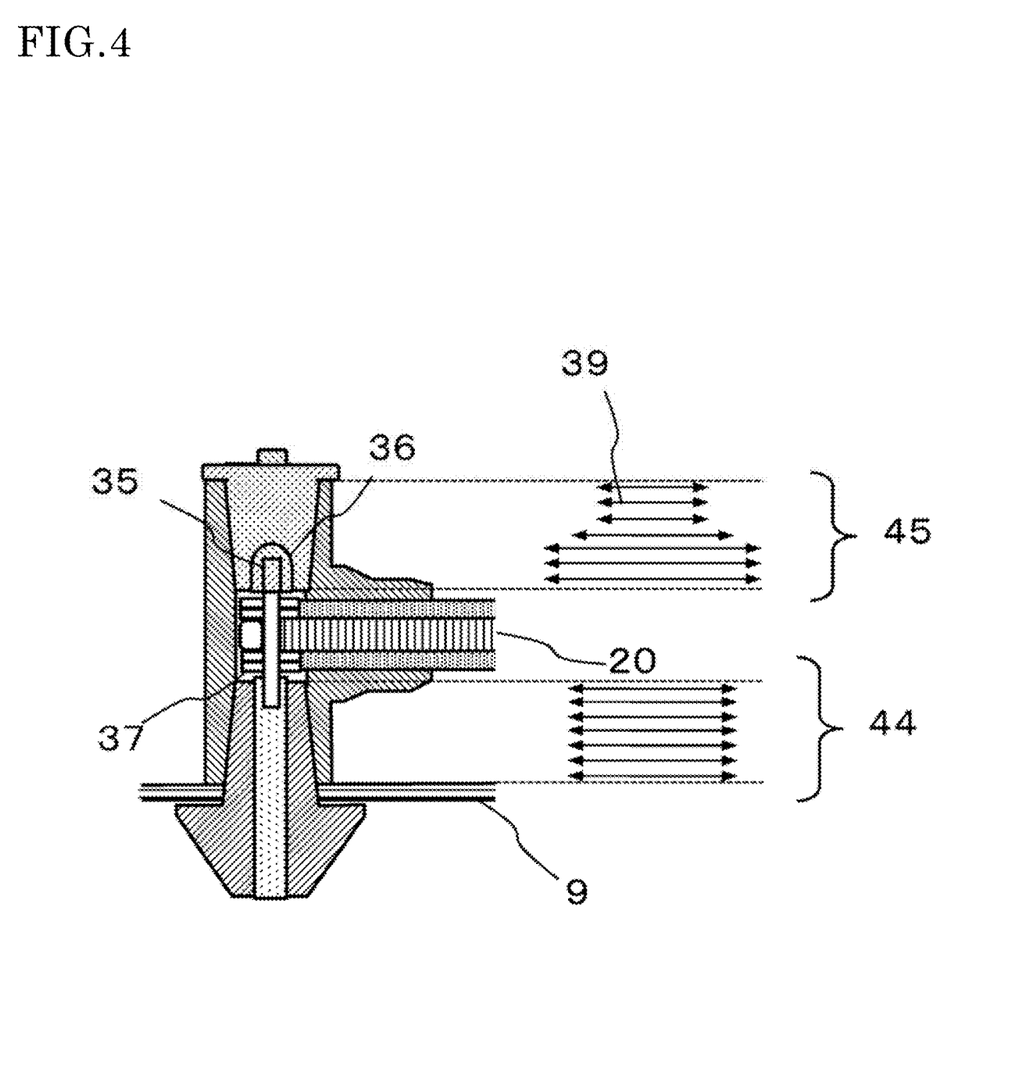
FIG. 4 is a sectional view showing the assembled state of the busbar connecting device of embodiment 1.

FIG. 1 shows a usage example of a busbar connecting device, and shows a side sectional view of a switchgear to which the busbar connecting device is applied, as an example. FIG. 2 to FIG. 4 show the structure of the busbar connecting device described in embodiment 1. FIG. 2 shows a state in which the busbar connecting device is disassembled into parts and FIG. 3 shows an enlarged view of a work hole portion. FIG. 4 shows an assembled state, and arrows shown on the right side of FIG. 4 schematically show the pressure between the surfaces of an insulation busbar connector and an insulating plug and the pressure between the surfaces of the insulation busbar connector and a bushing.

<Usage Example of Busbar Connecting Device>

FIG. 1 shows a side sectional view of a switchgear 1 using a busbar connecting device 10, and the left side of FIG. 1 corresponds to the front of the switchgear 1, which is a face at which an operating device is placed.

A disconnector 2 and an operation mechanism 7 therefor, a vacuum circuit breaker 3 and an electromagnetic operation mechanism 8 therefor, a ground switch 4, an arrester 5, and a current transformer 6 are placed inside a housing 9 of the switchgear 1. The busbar connecting devices 10 are placed on the top surface and the back surface of the switchgear 1. In an example of FIG. 1, three systems each including busbars for three phases are used, and mounted by using bushings 16 inside the housing storing the disconnector 2. The busbar connecting devices 10 are arranged with their busbars connected to those of the adjacent switchgear 1 located on a front or back side of the drawing sheet of FIG. 1.

<Structure of Busbar Connecting Device>

FIG. 2 is a sectional view showing the structure of the busbar connecting device used in the present embodiment, which is disassembled into principal parts that are broadly divided into four parts: an insulating plug 12, an insulation busbar connector 11, the bushing 16, and a solid insulation busbar 22. Arrows 19 shown between these parts indicate directions in which the parts are inserted into the insulation busbar connector 11 at the time of assembly.

The busbar connecting device 10 described here is the busbar connecting device 10 to be connected to a terminal of the solid insulation busbar 22, and the insulation busbar connector 11 has only one busbar mounting hole 31. By forming the busbar mounting holes 31 on the right and left sides of the insulation busbar connector 11, the busbar connecting device 10 can be used for continuously connecting the solid insulation busbars 22.

In FIG. 2, the insulating plug 12 shown in an upper part of the drawing has a metal portion 36 at the lower surface, and, in this metal portion 36, an engagement hole 35 in which a stud bolt 27 is to be engaged in an assembly process, is formed. Although assembly of the busbar connecting device 10 will be described later, an end of the stud bolt 27 and the engagement hole 35 are threaded and, by inserting the stud bolt 27 into the engagement hole 35 and turning the stud bolt 27 in a process of inserting the insulating plug 12, the stud bolt 27 can be inserted more deeply along the thread.

In the solid insulation busbar 22 shown in a right part of FIG. 2, a busbar conductor 20 is exposed at the right and left ends. A central part other than the ends is coated with an insulating shield 21 made of resin, which provides a structure preventing short-circuit and the like.

The bushing 16 is shown in a lower part of FIG. 2. A current conductor 15 made of metal is placed in the center of the bushing 16, and the current conductor 15 is covered around with a bushing mold 14 made of resin.

The stud bolt 27 is attached to the current conductor 15, and divided terminals 25 for holding an end of the busbar conductor 20 by pressing from above and below and a contact conductor 26 for holding the busbar conductor 20 from a side surface are attached.

In the insulation busbar connector 11 shown in the center, a bushing mounting hole 30 is formed at a lower surface, the busbar mounting hole 31 for mounting the solid insulation busbar 22 is formed at a right surface, and a work hole 32, through which the busbar conductor 20 is fixed to the stud bolt 27 and into which the insulating plug 12 is then inserted, is formed at a top surface.

Since a part, of the bushing 16, that is inserted into the insulation busbar connector 11 has a truncated cone shape, the bushing mounting hole 30 also has a truncated cone shape gradually tapered toward a deep part thereof.

As with the bushing 16, the insulating plug 12 which is inserted into the work hole 32 has a truncated cone shape. In general, as with the bushing mounting hole 30, basically the work hole 32 also has a truncated cone shape gradually tapered in a downward direction at a constant rate so as to correspond to the insulating plug 12 which is inserted therein.

FIG. 3 is an enlarged view showing a part corresponding to the work hole 32 and the insulating plug 12.

In the work hole 32 shown in FIG. 3, a shape indicated by dashed lines 38 shows a general truncated-cone-shaped work hole 32 corresponding to the truncated-cone-shaped insulating plug 12.

As with the conventional general work hole 32, the work hole 32 of the present embodiment has basically a truncated cone shape and is gradually tapered from a shallow part to a deep part of the work hole 32.

However, as compared with the general work hole 32 shown by the truncated cone shape indicated by the dashed lines 38 in FIG. 3, the work hole 32 of the present embodiment has a diameter size including an opening 17 at the shallow part of the work hole 32 close to the outside, and this diameter is larger than the diameter of the general work hole 32 corresponding to the insulating plug 12.

Furthermore, in the deep part of the work hole 32, as compared with the general work hole 32 having a truncated cone shape, a protrusion 13 opposite to the opening 17 is formed and the diameter thereof is smaller than the diameter of the work hole 32 corresponding to the insulating plug 12.

In the present embodiment, since the work hole 32 has the opening 17 and the protrusion 13, as compared with the conventional general work hole 32, the diameter of the work hole 32 is large at the shallow part close to the outside and, in contrast to this, the diameter of the work hole 32 is small at the deep part, and the work hole 32 has a step 13a at the intermediate part. Therefore, when the busbar connecting device 10 is assembled as described below, it is possible to form an intended distribution in the surface pressure between the inner circumferential surface of the work hole 32 and the outer circumferential surface of the insulating plug 12.

<Assembly of Busbar Connecting Device>

FIG. 2 and FIG. 3 show a state in which the parts are separated from each other in order to explain the structure of the busbar connecting device 10, and FIG. 4 shows a state after assembly.

An outline of an assembly procedure will be described with reference to FIG. 2 to FIG. 4.

The bushing 16 and the solid insulation busbar 22 are respectively inserted into the bushing mounting hole 30 and the busbar mounting hole 31 of the insulation busbar connector 11. The current conductor 15 of the bushing 16 and the busbar conductor 20 of the solid insulation busbar 22 form a connection portion as described below.

The two divided terminals 25 and the contact conductor 26 are attached to the stud bolt 27 inserted into the current conductor 15 of the bushing 16, and, as shown in FIG. 4, the busbar conductor 20 of the solid insulation busbar 22 is fixed by being held between the divided terminals 25 from above and below and held by the contact conductor 26 from the back surface. This connection operation is performed from the work hole 32 provided in the insulation busbar connector 11.

Then, the insulating plug 12 is inserted into the work hole 32 by applying a great force thereto from the outside, and a threaded portion of the stud bolt 27 is engaged in the engagement hole 35 at the lower surface of the insulating plug 12.

Then, by turning a screw, it is possible to fix the insulating plug 12 more accurately at a deep location in the insulation busbar connector 11.

In the work hole 32 of the insulation busbar connector 11 of the present embodiment, as shown in FIG. 3, the opening 17 is formed at the shallow part close to the outside and the protrusion 13 is formed at the deep part. Therefore, as compared with the case of a general truncated cone shape, the diameter of the work hole 32 of the present embodiment is large at the shallow part close to the outside and the diameter is small at the deep part. Thus, when the insulating plug 12 is inserted into the work hole 32, the insulating plug 12 is inserted into the hole having a large diameter at an initial insertion stage, which makes it very easy to perform the insertion.

As shown in FIG. 4, when the entire insulating plug 12 is inserted into the work hole 32, the surface pressure becomes great, and the surface pressure between the outer circumferential surface of the insulating plug 12 and the inner circumferential surface of the work hole 32 is small at the shallow part of the work hole 32 close to the outside because of a large diameter, and is great at the deep part because of a small diameter.

The distribution of the surface pressure between the outer circumferential surface of the insulating plug 12 and the inner circumferential surface of the work hole 32 will be described in more detail with reference to FIG. 4.

The lengths of a plurality of arrows 39 shown on the right side of the sectional view of the busbar connecting device of FIG. 4 schematically indicate the magnitude of the surface pressure between the outer circumferential surface of the insulating plug 12 and the inner circumferential surface of the work hole 32, and the vertical arrangement of the arrows 39 indicates positions inside the busbar connecting device 10.

In FIG. 4, a group of arrows 44 shown in a lower part indicates the surface pressure distribution when the bushing 16 has been mounted into the bushing mounting hole 30. Here, all the arrows 44 have the same length, which indicates that the surface pressure is the same on the whole surface. That is, since the bushing mounting hole 30 has a truncated cone shape similar to the bushing 16 having a truncated cone shape, the surface pressure exhibits a uniform in-plane distribution.

A group of arrows 45 shown in an upper part indicates the surface pressure distribution when the insulating plug 12 has been inserted into the work hole 32. That is, at the shallow part of the work hole 32 close to the outside, since the opening 17 is formed and the work hole 32 is enlarged, the surface pressure is smaller than that of the work hole 32 having a general truncated cone shape, and at the deep part, since the work hole 32 is narrowed by the protrusion 13, the surface pressure is greater than that of the work hole 32 having a general truncated cone shape.

On the other hand, in the course of inserting the insulating plug 12 into the work hole 32 of the insulation busbar connector 11, an air space 37 is formed in a central portion of the insulation busbar connector 11 as shown in FIG. 4. The internal pressure of this air space 37 increases with the progress of the insertion of the insulating plug 12.

However, since the protrusion 13 and the insulating plug 12 face each other at the deep part of the work hole 32, the protrusion 13 and the insulating plug 12 press each other at an extremely great pressure as described above. Therefore, even when the internal pressure of the air space 37 at the center of the insulation busbar connector 11 becomes great, the air in the air space 37 cannot enter an interface formed by the protrusion 13 and the insulating plug 12, and air voids are not formed in the interface portion.

<Effects of Busbar Connecting Device of the Present Embodiment>

The deep part of the work hole 32, in which the protrusion 13 and the outer circumferential surface of the insulating plug 12 come into contact with each other, is a portion which is very close to the stud bolt 27, the busbar conductor 20 of the solid insulation busbar 22, and the like, and a strong electric field is applied thereto. However, since air voids are not present between the protrusion 13 on the inner circumferential surface of the work hole 32 and the outer circumferential surface of the insulating plug 12, and the protrusion 13 and the outer circumferential surface of the insulating plug 12 are in direct contact with each other, discharge or the like does not occur, and thus the excellent busbar connecting device 10 that does not suffer from deterioration can be obtained.

In the work hole 32 having a truncated cone shape like the general work hole 32, by equally reducing the diameter of the work hole 32 throughout its length irrespective of a shallow part close to the outside or a deep part, it is possible to increase the surface pressure between the inner circumferential surface of the work hole 32 and the outer circumferential surface of the insulating plug 12, so that, as described in the present embodiment, no air is present at the interface between the work hole 32 and the insulating plug 12 and discharge can be prevented.

However, when the surface pressure between the inner circumferential surface of the work hole 32 and the outer circumferential surface of the insulating plug 12 is increased on the whole surface, a greater force is required for inserting the insulating plug 12 than in the case of the present embodiment, so that it becomes very difficult to perform an assembly process for the busbar connecting device 10.

In contrast, in the busbar connecting device 10 described in the present embodiment, it is possible to increase the surface pressure at the deep part of the work hole 32 and thereby prevent discharge and, at the same time, increase the diameter of the work hole 32 by forming the opening 17 at the shallow part of the work hole 32 close to the outside and thereby make the surface pressure smaller than usual. Therefore, a force for inserting the insulating plug 12 into the work hole 32 does not exceed a force required when the work hole 32 has a general truncated cone shape, and no problem arises in an assembly process for the busbar connecting device 10.

Although the surface pressure is reduced at the shallow part of the work hole 32 close to the outside, this part is away from high-voltage parts such as the stud bolt 27 and the busbar conductor 20 and does not suffer from a discharge problem. Therefore, no inconvenience is caused by the reduced surface pressure.

As described above, in the present embodiment, it is possible to obtain the favorable busbar connecting device 10 with good workability and high reliability.

Embodiment 2

A busbar connecting device 10 of the present embodiment will be described with reference to mainly FIG. 5A.

The basic configuration of the busbar connecting device 10 is the same as that in embodiment 1, and in the present embodiment, the bushing mounting hole 30 has a different shape.

Figure 5A:
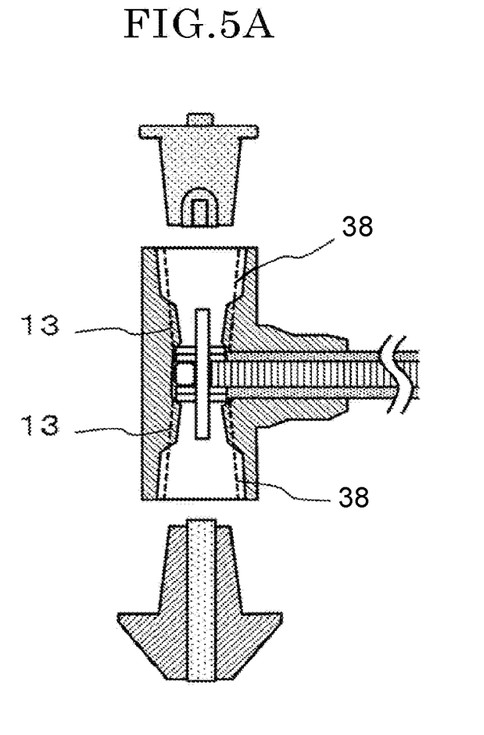
FIGS. 5A and 5B are sectional views illustrating protrusions of busbar connecting devices of embodiments 2 and 3.

FIG. 5A is a sectional view of the busbar connecting device 10 according to the present embodiment, which is similar to embodiment 1 in the configuration and shape of the insulating plug 12 at the upper part and in that the work hole 32 has the opening 17 at the shallow part close to the outside and the protrusion 13 at the deep part and has a step in the middle thereof as compared with a general truncated cone shape. As a result, similar to embodiment 1, the surface pressure at the deep part of the work hole 32 becomes great, so that air is less likely to be present therein and discharge and the like can be prevented, and in addition, the surface pressure at the shallow part close to the outside is not small and no problem arises in workability.

In the present embodiment, the above-described relationship between the work hole 32 and the insulating plug 12 is also applied to the relationship between the bushing mounting hole 30 of the insulation busbar connector 11 and the bushing 16, so that an opening 17 is provided at a shallow part of the bushing mounting hole 30 close to the outside and a protrusion 13 is provided at a deep part.

As a result, a great surface pressure can be obtained at the deep parts in both the interface between the work hole 32 and the insulating plug 12 and the interface between the bushing mounting hole 30 and the bushing 16, and no air is present at the interfaces. Moreover, discharge does not occur even at a high-voltage part.

Furthermore, at the shallow parts of the work hole 32 and the bushing mounting hole 30 close to the outside, the surface pressure can be reduced, whereby good workability can be obtained.

As described above, in the present embodiment, it is possible to obtain the favorable busbar connecting device 10 with good workability and high reliability.

Embodiment 3

A busbar connecting device 10 of the present embodiment will be described with reference to mainly FIG. 5B.

The basic configuration of the busbar connecting device 10 is the same as those of embodiment 1 and embodiment 2, and the present embodiment is different in that the shape of the opening 17 and the protrusion 13 which are formed in each of the work hole 32 and the bushing mounting hole 30 is not a step-like shape as shown in FIG. 5A and the like, but the size of each of the work hole 32 and the bushing mounting hole gradually changes from an opening 29 to a protrusion 28.

Figure 5B:
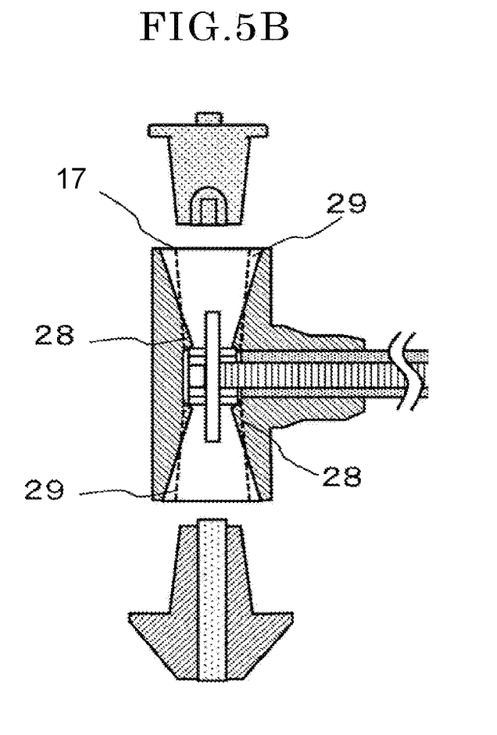

FIG. 5B is a sectional view of the busbar connecting device 10 according to the present embodiment, which is similar to embodiment 2 in that the work hole 32 and the bushing mounting hole 30 each have the protrusion 28 which reduces the size of the hole, at the deep part, and the opening 29 at the shallow part close to the outside, as compared with a general truncated cone shape.

In FIG. 5B, dashed lines 38 indicate the cross-sectional shapes of the work hole 32 and the bushing mounting hole 30 which have a general truncated cone shape. In the present embodiment, by providing the protrusion 28 and the opening 29, the size of the diameter of each of the work hole 32 and the bushing mounting hole 30 is made small at the deep part and made large at the shallow part close to the outside, as compared with the case of a general truncated cone shape. That is, it can be said that the slope angle of the side surface of the truncated cone shape is made small.

As a result, a great surface pressure can be obtained at the deep parts in both the interface between the work hole 32 and the insulating plug 12 and the interface between the bushing mounting hole 30 and the bushing 16, and no air is present at the interfaces. Therefore, discharge does not occur even at a high-voltage part.

Furthermore, at the shallow parts of the work hole 32 and the bushing mounting hole 30 close to the outside, the surface pressure can be reduced, and no problem arises in workability.

As described above, in the present embodiment, it is possible to obtain the favorable busbar connecting device 10 with good workability and high reliability.

In the present embodiment, an example in which the opening 29 and the protrusion 28 are formed in both the work hole 32 and the bushing mounting hole 30 has been described. However, the same effects can be obtained even in the case of forming the opening 29 and the protrusion 28 in only the work hole 32 or the bushing mounting hole 30.

Embodiment 4

A busbar connecting device 10 of the present embodiment will be described with reference to mainly FIG. 6.

Figure 6:
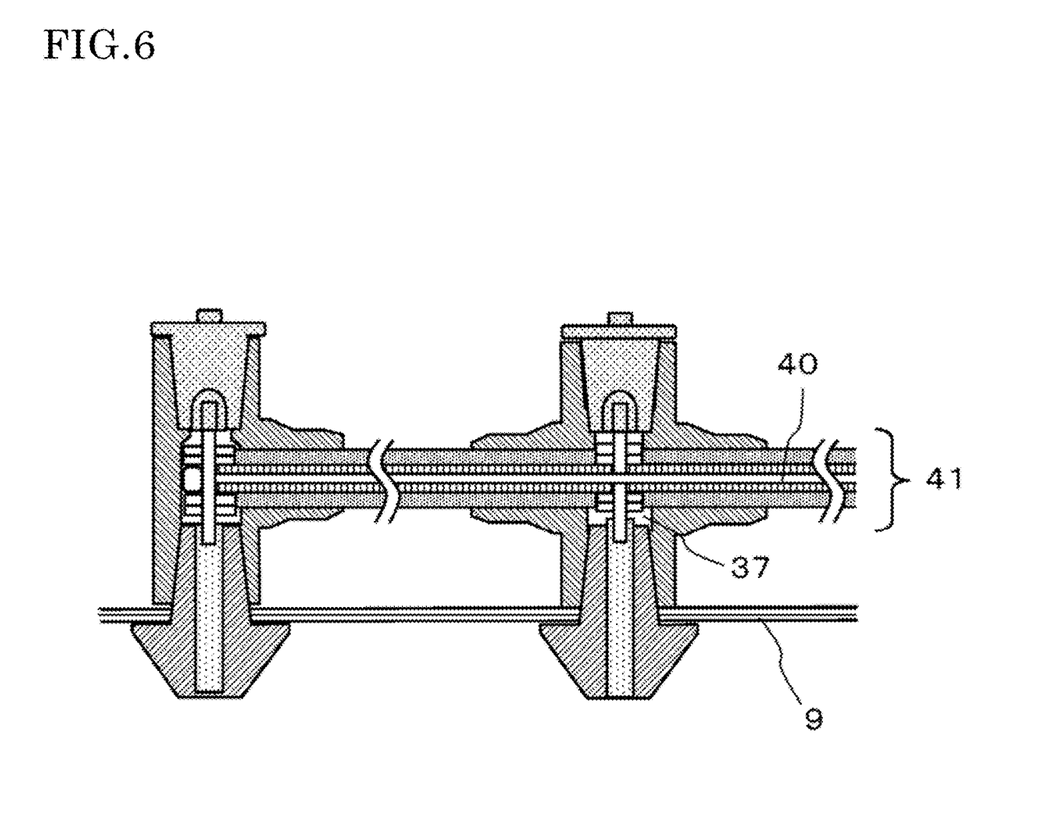
FIG. 6 is a sectional view showing the structure of a busbar connecting device of embodiment 4.

The basic configuration of the busbar connecting device 10 is the same as that in embodiment 1, and FIG. 6 shows a state in which the busbar connecting device 10 is assembled and attached to the housing 9 via the bushing 16.

The present embodiment is different from embodiment 1 in that a hollow busbar 41 having a hollow part 40 is used in the center of the solid insulation busbar 22.

By using the hollow busbar 41, it is possible to increase the volume of the air space 37 and suppress an increase in the pressure of the air space 37 at the time of inserting the insulating plug 12 into the work hole 32. This makes it possible to prevent air from entering the interface between the insulating plug 12 and the work hole 32, and between the bushing 16 and the bushing mounting hole 30.

As described above, in the busbar connecting device 10 of the present embodiment, discharge is prevented by preventing air from entering the interface between the insulating plug 12 and the work hole 32, and between the bushing 16 and the bushing mounting hole 30, and no problem arises in workability. Thus, it is possible to obtain the busbar connecting device 10 with good workability and high reliability.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 switchgear
2 disconnector
3 vacuum circuit breaker
4 ground switch
5 arrester
6 current transformer
7 operation mechanism
8 electromagnetic operation mechanism
9 housing
10 busbar connecting device
11 insulation busbar connector
12 insulating plug
13 protrusion
14 bushing mold
15 current conductor
16 bushing
17 opening
19 arrow
20 busbar conductor
21 insulating shield
22 solid insulation busbar
25 divided terminal
26 contact conductor
27 stud bolt
28 protrusion
29 opening
30 bushing mounting hole
31 busbar mounting hole
32 work hole
35 engagement hole
36 metal portion
37 air space
38 dashed line
39 arrow
40 hollow part
41 hollow busbar
44 arrow
45 arrow

The invention claimed is:

1. A busbar connecting device comprising:
a connection portion in which a busbar conductor and a current conductor of a bushing are connected;
an insulation busbar connector covering the connection portion, the insulation busbar connector having a work hole extending into the insulation busbar connector from an outer opening of the work hole of the insulation busbar connector, the work hole communicating with the connection portion; and
an insulating plug inserted into the work hole from the outer opening of the insulation busbar connector and configured to seal the outer opening of the work hole when inserted, the insulating plug has an external truncated cone shape defining an external shape, the external truncated cone shape expands toward the outer opening of the insulation busbar connector when the insulation plug is inserted into the work hole, the external truncated cone shape of the insulating plug corresponding to an internal shape of the work hole,
wherein the internal shape of the work hole includes:
a diameter at a deeper part of the work hole relative to the outer opening, the diameter defining a virtual cone extending virtually from the diameter and expanding toward the outer opening of the work hole,
a truncated portion at a shallower part of the work hole relative to the outer opening and expanding toward the outer opening, the truncated portion disposed entirely outside of the virtual cone,
a protrusion portion disposed at an intermediate part of the work hole and located between the shallower and deeper parts of the work hole, the protrusion portion expanding toward the outer opening and disposed entirely inside of the virtual cone,
a narrowing portion transitioning between the truncated portion and the protrusion portion, the narrowing portion expanding toward the outer opening, and
a widening portion transitioning between the protrusion portion and the diameter, the widening portion reducing toward the outer opening,
wherein the truncated portion, the narrowing portion, the protrusion portion, the widening portion and the diameter are substantially coaxial with each other,
wherein a surface pressure between a surface of the protrusion portion and a first portion of an external surface of the insulating plug that mates with the protrusion portion is greater than a surface pressure between a surface of the truncated portion and a second portion of the external surface of the insulating plug that mates with the truncated portion.

2. The busbar connecting device according to claim 1, wherein
the bushing is inserted into a bushing mounting hole formed in the insulation busbar connector, and
a surface pressure between an outer circumferential surface of the bushing and an inner circumferential surface of the bushing mounting hole is greater at a deeper part of the bushing mounting hole relative to an outer opening of the bushing mounting hole than at a shallower part of the bushing mounting hole relative to the outer opening of the bushing mounting hole.

3. The busbar connecting device according to claim 2, wherein
the outer circumferential surface of the bushing defines an external truncated cone shape,
the inner circumferential surface of the bushing mounting hole defines an internal shape,
the external truncated cone shape of the bushing tapers toward the deeper part of the bushing mounting hole and the external truncated cone shape of the bushing corresponds to the internal shape of the bushing mounting hole,
the internal shape of the bushing mounting hole includes second diameter defining a second virtual cone extending virtually from the second diameter and expanding toward the outer opening of the bushing mounting hole, the second diameter at the deeper part of the bushing mounting hole relative to the outer opening of the bushing mounting hole,
a second truncated portion at the shallower part of the bushing mounting hole relative to the outer opening of the bushing mounting hole and expanding toward the outer opening of the bushing mounting hole, the second truncated portion disposed entirely outside of the second virtual cone, a second protrusion portion disposed at an intermediate part of the bushing mounting hole and located between the shallower and deeper parts of the bushing mounting hole, the second protrusion portion expanding toward the outer opening of the bushing mounting hole and disposed entirely inside of the second virtual cone, a second narrowing portion transitioning between the second truncated portion and the second protrusion portion, the second narrowing portion expanding toward the outer opening of the bushing mounting hole, and a second widening portion transitioning between the second protrusion portion and the second diameter, the second widening portion reducing toward the outer opening of the bushing mounting hole, wherein the second truncated portion, the second narrowing portion, the second protrusion portion, the second widening portion and the second diameter are substantially coaxial with each other.

4. The busbar connecting device according to claim 3, wherein
the busbar conductor includes a hollow hole extending from one end to another end of the busbar conductor.

5. The busbar connecting device according to claim 2, wherein
the outer circumferential surface of the bushing defines an external truncated cone shape,
the inner circumferential surface of the bushing mounting hole defines an internal truncated cone shape,
the bushing has the external truncated cone shape tapered toward a distal end of the bushing, and
as compared with the internal truncated cone shape corresponding to the external truncated cone shape of the bushing, a diameter of the internal truncated cone shape of the bushing mounting hole changes, and has a third diameter at the deeper part of the bushing mounting hole and a fourth diameter at the shallower part of the bushing mounting hole wherein the third diameter is less than the fourth diameter.

6. The busbar connecting device according to claim 5, wherein
the busbar conductor includes a hollow hole extending from one end to another end of the busbar conductor.

7. The busbar connecting device according to claim 2, wherein
the busbar conductor includes a hollow hole extending from one end to another end of the busbar conductor.

8. The busbar connecting device according to claim 1, wherein
the busbar conductor includes a hollow hole extending from one end to another end of the busbar conductor.

* * * * *